Patented Dec. 24, 1946

2,413,000

UNITED STATES PATENT OFFICE 2,413,000

METHOD

William L. Ruigh, Princeton, N. J., assignor to E. R. Squibb & Sons, New York, N. Y., a corporation of New York No Drawing. Application January 29, 1943,
Serial No. 473,973

2 Claims. (Cl. 260—397.3)

This invention relates to the preparation of progestational agents (products comprising progesterone or having the physiological activity of progesterone) and related compositions. Progestational agents have heretofore been produced from cholesterol and cholestenone by a number of direct and indirect oxidative procedures, but such processes have been unsatisfactory because of their complexity or inefficiency, or for other reasons.

It is the object of this invention to provide a simple and relatively efficient method of preparing progestational agents and related compositions.

The method of this invention essentially comprises ozonizing a solution of a 3-keto-5,6-dihalo-10,13-dimethyl-17-R-cyclopentanoperhydrophenanthrene in an ozone-inert solvent, and dehalogenating the resulting 3-keto-5,6-dihalo-10,13-dimethyl-17-acetyl - cyclopentanoperhydrophenanthrene, R being an acylic, secondary, α-substituted-ethyl radical, especially an acylic, secondary, α-substituted-ethyl radical present in the 17-position of a naturally-occurring steroid. Ozonization is preferably effected in the presence of an acid-binding agent, such as calcium carbonate, piperidine, or piperidine acetate, especially if the 3-keto-5,6-dihalo-10,13-dimethyl-17-R-cyclopentanoperhydrophenanthrene is unstable (as is the case with 5,6-dibromo-cholestanone).

By "ozonizing" is meant, of course, oxidation by means of ozone, as effected, for example, by intimately contacting the solution of the reactant with air or oxygen containing ozone.

The method of this invention is especially applicable to (and will be illustrated by the exemplificative disclosure of) the preparation of a progestational agent from 5,6-dibromo-cholestanone.

Example 1

(a) 3 g. 5,6-dibromo-cholestanone (cholestenone-dibromide) is dissolved in 50 cc. ethyl chloride, and 1.5 g. dry calcium carbonate is added to the solution. The mixture is cooled to 0° C., and a stream of 10% ozone in oxygen is bubbled through it for 3.5 hours. The reaction mixture is then cautiously evaporated to dryness, and the residue is taken up in 100 cc. ether to which has been added 3 cc. water.

(b) An excess of fine zinc dust is added to the ether solution, followed by 25 cc. glacial acetic acid in small portions. The mixture is refluxed for an hour and filtered through a filter-aid (e. g., the diatomaceous-earth product Super-Cel); and the etheral filtrate is washed twice with water and then with 100 cc. 2 N. sodium hydroxide solution. The ether is evaporated, and the residual neutral oil (weighing 1.64 g.) is taken up in 200 cc. hexane and filtered to remove a small amount of insoluble gum. The hexane solution is then extracted with two 100 cc. and one 25 cc. portions of concentrated hydrochloric acid; and the combined acid extracts are washed with one 25 cc. portion of hexane and then diluted with two volumes of water. The diluted acid solution is extracted twice with 150 cc. portions of hexane, and the combined hexane extract is washed with water and dried with potassium carbonate. On evaporating the hexane, 143 mg. of a resinous hormone product is obtained, which on assay shows a progesterone content of at least 8.8 mg.

Example 2

A mixture of 3 g. 5,6-dibromo-cholestanone, 1.5 g. calcium carbonate, and 50 cc. chloroform is ozonized for 4 hours at 25° C., and the reaction mixture is worked up substantially as described in Example 1. The resinous hormonal product obtained (weighing 62 mg.) is dissolved in 10.9 cc. 95% alcohol, and the alcohol is evaporated off, 1.5 cc. of corn oil being added towards the end of the evaporation. The oil solution, on assay for progesterone by the Clauberg technique on normal immature rabbits, gives a 4+ reaction, indicating a concentration of over 1 mg./cc.

Example 3

15 g. 5,6-dibromo-cholestanone is dissolved in 50 cc. chloroform, and 3 cc. of a 5% solution of piperidine in chloroform and 10 cc. glacial acetic acid are added. The mixture is ozonized for 6 hours, and the reaction mixture is worked up substantially as described in Example 1. The resinous hormonal product obtained (weighing 215 mg.), on assay, shows a progesterone content of more than 25 mg.

The 5,6-dibromo-cholestanone reactant employed in the foregoing examples has been prepared heretofore; but the following specific disclosure of a convenient method of preparing it from cholesterol is included because it is exemplificative of the preparation of other 3-keto-5,6-dihalo-10,13- dimethyl - 17-R - cyclopentanoperhydrophenanthrene reactants, some of which may not have been prepared heretofore.

Preparation of cholesterol dibromide 50 g. cholesterol is dissolved in 500 cc. ether.

and the solution is treated with a decolorizing carbon (e. g., Darco) and filtered with the aid of Super-Cel. Then a solution of 8 cc. bromine in 250 cc. glacial acetic acid is added, and the reaction mixture is shaken thoroughly, allowed to stand for about 20 minutes in an ice bath, and filtered. The precipitate (cholesterol dibromide) is washed several times with acetic acid, then 2 or 3 times with water, and finally twice with methanol, and then air-dried. The yield (first crop of crystals) is about 57.0 g.; and an additional 10% or more can be recovered from the mother liquor.

Preparation of 5,6-dibromo-cholestanone 50 g. cholesterol dibromide is suspended in 1250 cc. glacial acetic acid; a solution of 12.5 g. $CrO_3$ in 25 cc. water is added, and the reaction mixture is stirred vigorously and maintained at 55° C. for a half hour. Then about 40 cc. ethanol is added (to destroy excess $CrO_3$), and stirring is continued for 5–10 minutes longer. To the resulting dark green solution water is added until turbidity occurs; and the mixture is cooled by an ice bath for about 20 minutes (or until its temperature is 20° C. or less) and filtered. The precipitate (5,6-dibromo-cholestanone) is sucked as dry as possible, washed twice with methanol and again sucked dry. The product is then immediately recrystallized by dissolving it in 600–700 cc. ether to which has been added 10–15 g. calcium carbonate, adding several grams of Darco, shaking for 5 minutes, filtering, evaporating ether from the filtrate until crystals just begin to form, and quickly adding an equal volume of warm methanol and cooling in a refrigerator. The resulting precipitate is filtered off, washed twice with methanol, air-dried in a darkened room (or at least kept out of strong light) and then immediately bottled and placed in a refrigerator to prevent decomposition.

The invention is manifestly applicable to the production of progestational agents and related compositions from reactants of the general formula 3-keto-5,6-dihalo-10,13-dimethyl-17-R-cyclopentanoperhydrophenanthrene other than 5,6-dibromo-cholestanone. Thus, reactants of that general formula (a) related to sterols other than cholesterol—inter alia, $\beta$-sitosterol and campesterol—or (b) related to certain bile acids—inter alia, 3-hydroxy-$\Delta^{5,6}$-cholenic acid, 3-hydroxy-$\Delta^{5,6}$-nor-cholenic acid and 3-hydroxy-$\Delta^{5,6}$-bis-nor-cholenic acid—may be substituted for the 5,6-dibromo-cholestanone in the foregoing examples. Such reactants (e. g., 5,6-dibromo-$\beta$-sitostanone) may be obtained by adding bromine to the sterol or bile acid (e. g., $\beta$-sitosterol) in the manner described hereinbefore in connection with the production of cholesterol dibromide, and oxidizing the hydroxy group of the resulting sterol or bile-acid dibromide (e. g., $\beta$-sitosterol dibromide) in the manner described hereinbefore in connection with the production of 5,6-dibromo-cholestanone.

The solvents employed for the ozonization in the foregoing examples may be replaced by any other of the commonly employed ozonization solvents (e. g., ethyl acetate) or any suitable ozone-inert solvent. The dehalogenation of the 3-keto-5,6-dihalo-10,13-dimethyl-17-acetyl-cyclopentanoperhydrophenanthrene may be effected by treatment with finely divided metals other than zinc—inter alia, iron, and other active metals and metal alloys, such as aluminum amalgam—or by Schoenheimer's method employing potassium iodide; and acids other than acetic—inter alia, sulfuric acid, hydrochloric, and phosphoric—may be employed with the dehalogenating metal.

The invention may be variously otherwise embodied within the scope of the appended claims.

I claim:

1. The method of preparing a progestational agent, which comprises ozonizing a solution of 5,6-dibromocholestanone in an ozone-inert solvent in the presence of an acid-binding agent.

2. The method which comprises ozonizing a solution of 5,6-dibromo-cholestanone in an ozone-inert solvent in the presence of an acid-binding agent, and debrominating the thus-formed progesterone dibromide.

WILLIAM L. RUIGH.